(No Model.) 2 Sheets—Sheet 1.

P. O'BRIEN.
TIRE SETTING APPARATUS.

No. 503,435. Patented Aug. 15, 1893.

Witnesses
Edwin L. Bradford
Curtis Lammond

Inventor
Patrick O'Brien
By Wm Crew Intire his Attorney (No Model.)  2 Sheets—Sheet 2.
P. O'BRIEN.
TIRE SETTING APPARATUS.
No. 503,435. Patented Aug. 15, 1893.
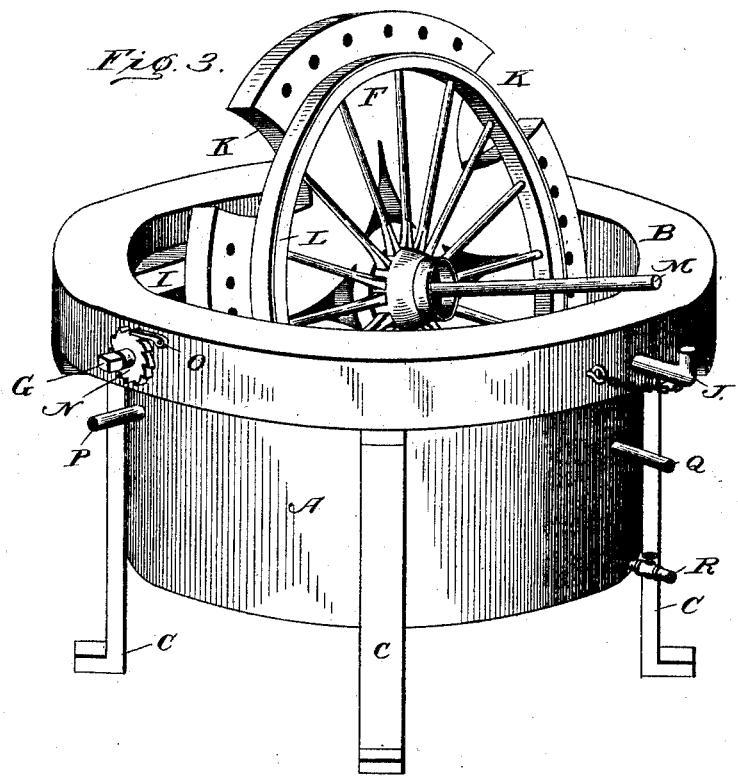
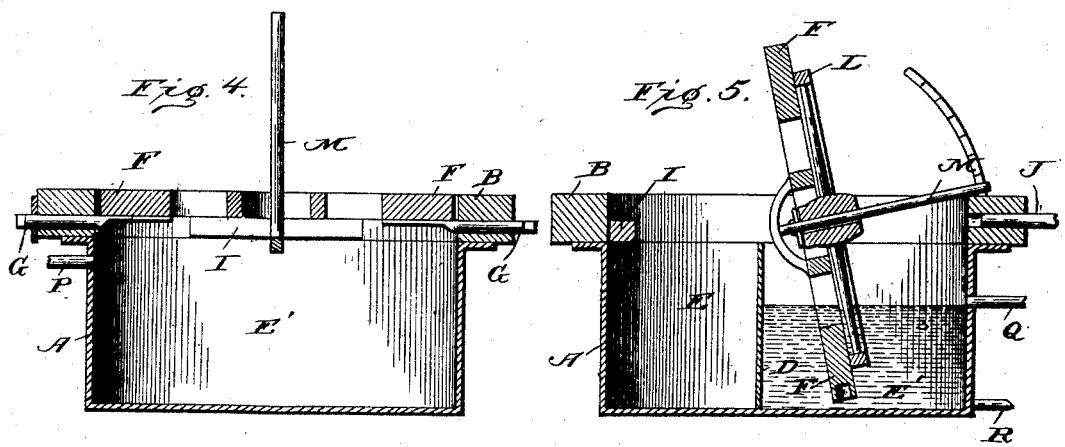
Witnesses
Edwin L Bradford
Curtis Lammond
Inventor
Patrick O'Brien
By Wm C W McIntire, his Attorney

UNITED STATES PATENT OFFICE.

PATRICK O'BRIEN, OF SOUTH BEND, INDIANA.

TIRE-SETTING APPARATUS.

SPECIFICATION forming part of Letters Patent No. 503,435, dated August 15, 1893.

Application filed December 30, 1892. Serial No. 456,761. (No model.)

*To all whom it may concern:*

Be it known that I, PATRICK O'BRIEN, a citizen of the United States, residing at South Bend, in the county of St. Joseph and State of Indiana, have invented certain new and useful Improvements in Tire-Setting Apparatus; and I do hereby declare the following to be a full, clear, and exact description of the invention, such as will enable others skilled in the art to which it appertains to make and use the same.

My invention relates to certain new and useful improvements in apparatus for setting and cooling tires. It has for its objects the ready and uniform cooling of the tire and avoidance of wetting the hub, and also the securement of perfect adjustment of the tire upon the rim.

With these objects in view my invention consists in the details of construction and arrangement hereinafter fully described and claimed.

In order that those skilled in the art to which my invention pertains may fully understand the same, I will proceed to describe the construction and mode of using my improved apparatus, referring by letter to the accompanying drawings, in which—

Figure 1:
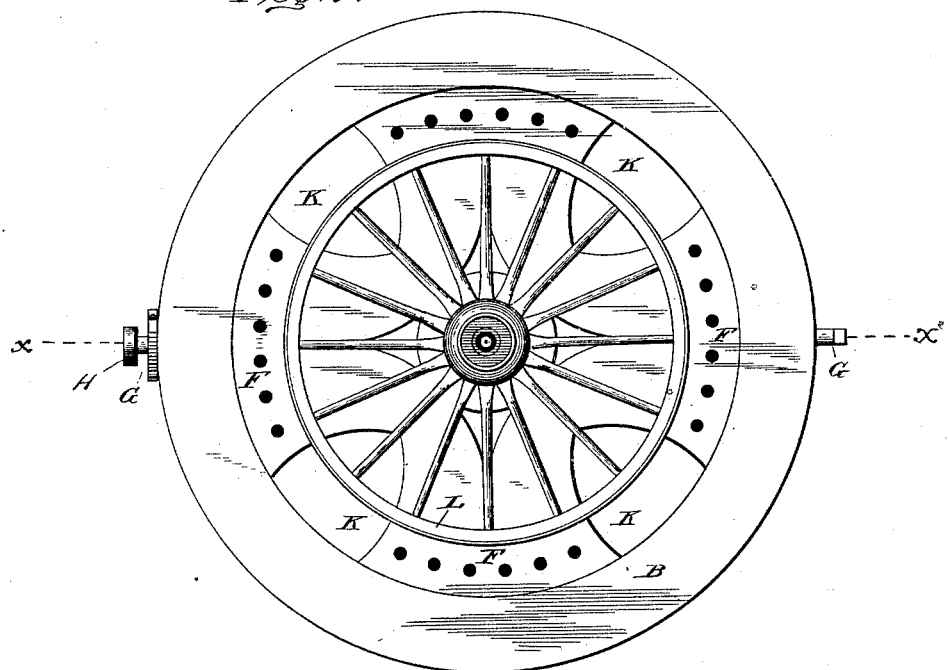
Figure 2:
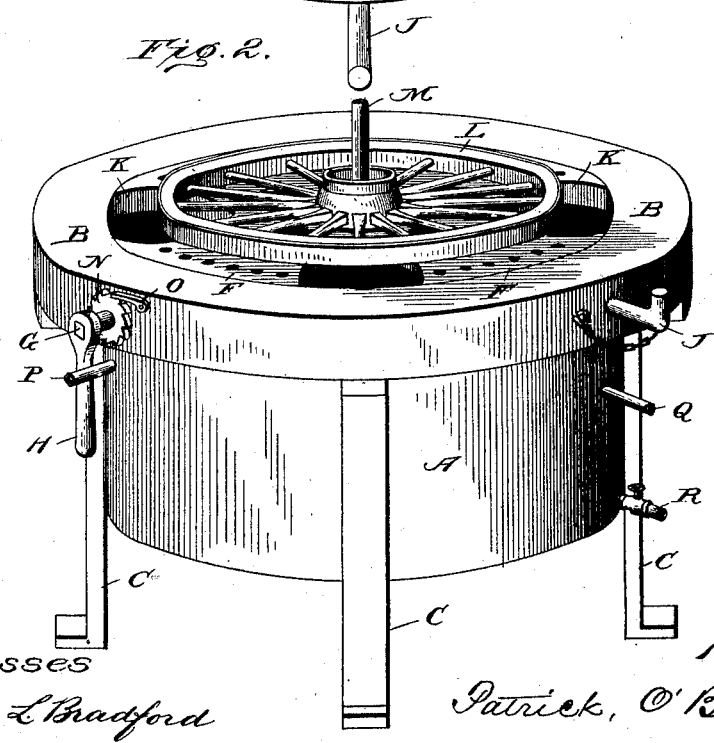

Figure 1 is a plan or top view of an apparatus embodying my invention. Fig. 2 is a perspective view of the same with the wheel and its rack or support in a horizontal position. Fig. 3 is a similar view with the wheel and its rack in an inclined position within the water tank. Fig. 4 is a central vertical section at the line $x$, $x$ of Fig. 1; and Fig. 5 is a similar section taken at right angles to that shown in Fig. 4.

Similar letters denote like parts in the several figures.

A represents a water tank, preferably of cylindrical form, supported within or secured to a strong curb B, which latter is mounted upon rigid legs C, or which may be supported upon any other suitable support, such for instance as a brick or other wall.

The tank A is divided by a partition D into two compartments E and E'; the former may be used as a very handy tool box or receptacle and the latter for containing a supply of water into which the tire is submerged, as will be presently explained.

F is the wheel rack or support which is pivotally mounted within the curb B, upon a rock shaft, or short journals G, one or both of which may be provided with an operating crank or handle H and by means of which the rack may be tilted and raised.

The curb B is provided at the rear side with a flange or stop I (see Figs. 3 and 4) which constitutes an abutment and support for the rack when in its horizontal position, and is auxiliary to the supporting rock shaft or journals G and a latch or bolt J, which latter is used to lock or release the rack for obvious purposes.

The rack F is preferably made of iron and is formed with circumferential notches or openings K exposing the rim and tire of the wheel in order that the tire may be subsequently adjusted by tapping with hammers, and with a suitable hub recess as shown.

Suitable means are provided by which the wheel rack may be maintained at any desired inclination to submerge the wheel L to any depth in the water, one means consisting of a centrally arranged plug or axle M, the outer end of which will rest upon the curb B, or upon a rack secured thereto.

Another means is shown in Figs. 2 and 3, and consists of a ratchet N secured to the rock shaft, and a pawl O pivoted to the curb B.

P is a water inlet for supplying the tank and Q an overflow or waste pipe, by means of which the water is always maintained at a given level or depth and to compensate for evaporation.

R is a stop cock for emptying the tank when desired.

Having described the construction of my improved apparatus I will now describe the mode of using the same.

The wheel rack F being latched or secured in its horizontal position, and the wheel L being placed thereon, the heated tire is put upon the rim and forced into place. The latch J is then withdrawn, and by means of the handle H the rack and wheel are tilted vertically, as shown at Figs. 3 and 5, to such inclination and the tire submerged to such depth in the water within the tank as may be desired, and held in such position by the axle M, or ratchet and pawl N—O, and thereupon the wheel is rotated upon its hub which is seated within the hub recess of the rack (or where the axle M is employed it may be rotated upon that) until every part of the tire has been presented to the cooling action of the water within the tank; and at the same time or subsequently, and before removing the wheel, the tire may be thoroughly adjusted by rotating the wheel and tapping the tire from either side, the notches or openings K in the rack permitting this action.

I have described the tank A as constructed with two compartments E and E', but it will be understood that it may be formed with only the water compartment E' and the compartment E dispensed with, but I prefer to form the compartment E, or to otherwise utilize the space under the rack by constructing some other sort of tool receptacle, so that the usual tools employed shall always be near at hand.

From the construction illustrated and described it will be seen that tires may be very readily and rapidly set without exposing the hub of the wheel to the water, and that the whole apparatus is in compact and convenient form.

What I claim as new, and desire to secure by Letters Patent, is—

1. The tank A surrounded by a curb B supported as described, in combination with the wheel rack F mounted upon a rock shaft or journals G within the curb, and means as described for maintaining the rack when desired in a horizontal position, as hereinbefore set forth.

2. In combination with the tank A, curb B and rack F pivoted within the curb, the ratchet and pawl N—O for supporting the wheel rack at any degree of obliquity, substantially as and for the purpose set forth.

3. The curb B and wheel rack F, in combination with the tank A formed with compartments E, E', and provided with inlet and outlet pipes P, Q, and emptying cock R, substantially as and for the purposes set forth.

In testimony whereof I affix my signature in presence of two witnesses.

PATRICK O'BRIEN.

Witnesses:
EDWARD R. VANDERHOOF,
WILLIAM D. O'BRIEN.